(12) United States Patent
Ruiz Rodriguez

(10) Patent No.: US 9,966,072 B2
(45) Date of Patent: May 8, 2018

(54) METHOD AND DEVICES FOR LANGUAGE DETERMINATION FOR VOICE TO TEXT TRANSCRIPTION OF PHONE CALLS

(71) Applicant: Saronikos Trading and Services, Unipessoal Lda, Funchal, Madeira (PT)

(72) Inventor: Ezequiel Ruiz Rodriguez, Panama (PA)

(73) Assignee: SARONIKOS TRADING AND SERVICES, UNIPESSOAL LDA, Funchal, Madeira (PT)

( * ) Notice: Subject to any disclaimer, the term of this patent is extended or adjusted under 35 U.S.C. 154(b) by 0 days. days.

(21) Appl. No.: 14/650,153

(22) PCT Filed: Dec. 6, 2012

(86) PCT No.: PCT/EP2012/074706
§ 371 (c)(1),
(2) Date: Jun. 5, 2015

(87) PCT Pub. No.: WO2014/086424
PCT Pub. Date: Jun. 12, 2014

(65) Prior Publication Data
US 2015/0317975 A1 Nov. 5, 2015

(51) Int. Cl.
*G10L 15/26* (2006.01)
*G10L 15/00* (2013.01)
*H04M 3/533* (2006.01)

(52) U.S. Cl.
CPC ............ *G10L 15/26* (2013.01); *G10L 15/005* (2013.01); *H04M 3/533* (2013.01);
(Continued)

(58) Field of Classification Search
CPC .......................... G10L 15/005; H04M 3/533
See application file for complete search history.

(56) References Cited

U.S. PATENT DOCUMENTS 5,440,615 A * 8/1995 Caccuro ................ H04M 3/533
379/207.01
6,865,266 B1 * 3/2005 Pershan ............ H04M 3/42297
379/201.01
(Continued)

FOREIGN PATENT DOCUMENTS

CN 1255011 5/2000
JP 2003-288340 10/2003
(Continued)

OTHER PUBLICATIONS

International Search Report for Application No. PCT/EP2012/074706 dated Jul. 25, 2013.
(Continued)

*Primary Examiner* — Qian Yang
(74) *Attorney, Agent, or Firm* — Workman Nydegger

(57) ABSTRACT

Methods, and devices and systems, for example an answering machine system, are provided for determining a language among a plurality of languages available for a voice to text transcription of phone calls between a caller and a recipient. In the method, at least two of said available languages are proposed to the caller. The proposed languages are based on a phone country code corresponding to said caller, a phone country code corresponding to said recipient, a language from a set of languages available for the transcription by said answering machine system, or a language selected automatically on the basis of parameters set by the caller or the recipient. The caller selects said language by interacting with said answering machine system, and a corresponding voice message is transcribed into text of the selected language for forwarding to said recipient.

13 Claims, 1 Drawing Sheet

(52) U.S. Cl.
CPC .... *H04M 2201/40* (2013.01); *H04M 2201/60* (2013.01); *H04M 2203/2061* (2013.01); *H04M 2203/4536* (2013.01); *H04M 2242/12* (2013.01); *H04M 2250/58* (2013.01)

(56) References Cited

U.S. PATENT DOCUMENTS

| | | | |
|---|---|---|---|
| 2003/0163300 A1 | 8/2003 | Kasvand et al. | |
| 2004/0102201 A1 | 5/2004 | Levin | |
| 2004/0102957 A1* | 5/2004 | Levin | G06F 17/2735 704/3 |
| 2005/0239037 A1* | 10/2005 | Lertsithichai | A47B 19/10 434/365 |
| 2008/0304633 A1 | 12/2008 | Kochanowska | |
| 2009/0248392 A1* | 10/2009 | Talwar | G06F 17/289 704/3 |
| 2010/0159891 A1* | 6/2010 | Sigmund | H04M 3/02 455/413 |
| 2010/0303222 A1* | 12/2010 | Poder | H04M 3/436 379/207.12 |
| 2012/0035907 A1* | 2/2012 | Lebeau | G06F 17/28 704/2 |
| 2012/0035908 A1 | 2/2012 | Lebeau et al. | |
| 2012/0069131 A1* | 3/2012 | Abelow | G06Q 10/067 348/14.01 |
| 2012/0078609 A1* | 3/2012 | Chaturvedi | G06F 17/28 704/3 |
| 2014/0024332 A1* | 1/2014 | Droste | H04L 12/1895 455/404.2 |

FOREIGN PATENT DOCUMENTS

| | | |
|---|---|---|
| JP | 2003-324576 | 11/2003 |
| JP | 2007-300640 | 11/2007 |

OTHER PUBLICATIONS

Japanese Office Action issued for application No. JP 2015-545676 dated Jul. 5, 2016.
First Office Action for Chinese Application No. 201280077542.8 dated Sep. 27, 2016.

* cited by examiner

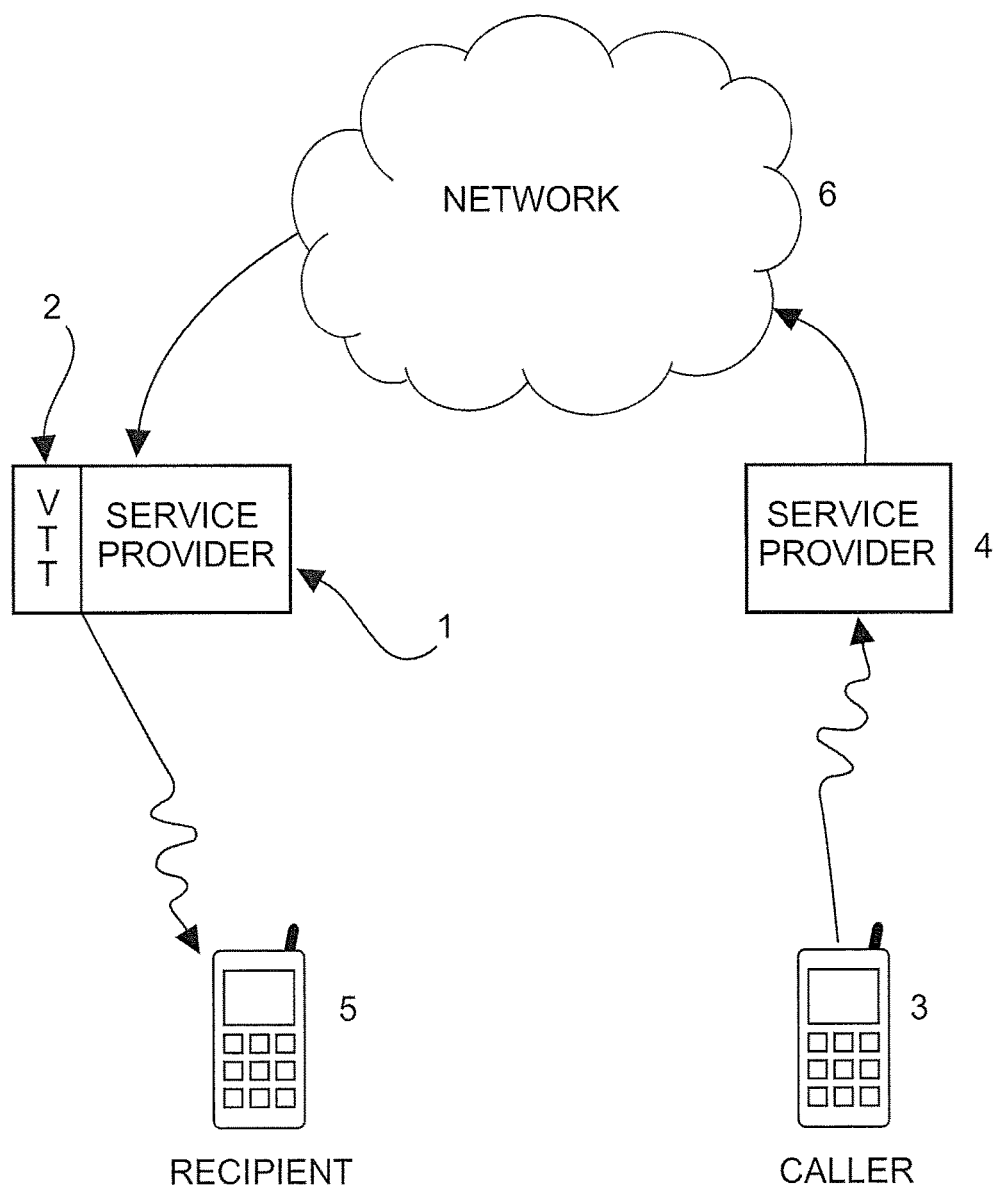

METHOD AND DEVICES FOR LANGUAGE DETERMINATION FOR VOICE TO TEXT TRANSCRIPTION OF PHONE CALLS

The present application claims priority from PCT Patent Application No. PCT/EP2012/074706 filed on Dec. 6, 2012, the disclosure of which is incorporated herein by reference in its entirety.

FIELD OF THE INVENTION

The present invention relates in general to a method, devices and systems for transcription of voice messages into text. It more particularly relates to method, devices and systems to determine the language of voice to text transcription.

There have been developed a variety of transcription systems and methods. For example when a caller establishes a connection to leave a message for a recipient, the call may be monitored by a transcription agent or analyzed by a transcription algorithm to recognize the correct language for transcription. The voice message is then transcribed manually by the agent or through the transcription algorithm into a text file. One of the disadvantages of manual voice to text transcription systems offered by state of the art solutions is the requirement of man power for transcription which limits, for cost reasons, the availability of the voice to text transcription service (VTTS) and inhibits the dissemination of VIIS on national and international level. The dissemination of manual VTTS requires a huge amount of man power because of different languages that can be involved. In addition available automatic VTTS are not reliable because of lack of performance of voice to text transcription (VTT) algorithms.

The first problem in the field of speech recognition systems is the language recognition. In the case of failing to recognize the correct language, this results in the corruption of all the post processing steps for automatic transcription. A further reason for inhibition of geographical extension of VTTS is that, in case of non-accessibility or non-availability of an actual recipient, answering machines for receiving calls do not provide the acceptable languages to communicate with the caller and to transcribe the voice message according to the correct language.

Accordingly, there is a need for a method, device and system for transcribing voice messages into text by determining the correct language based on different specifications or conditions, so to enhance the transcription performance.

SUMMARY OF THE INVENTION

It is therefore one objective of the present invention is to provide desirable languages to a caller and/or recipient for transcription of voice messages.

It is a further object of the present invention to provide a voice to text transcription mode for telephones, in particular for cell phones, that can be activated by a recipient in a way that, when the recipient is not available to accept voice calls, the language of transcription is chosen in a manner that the recipient can receive in any case transcribed voice messages in textual form.

The aforementioned objects and other objects of the present invention are achieved through a method for determining a language among a plurality of languages available for a voice to text transcription of phone calls between a caller and a recipient provided by an answering machine system, characterized in that at least two of said available languages are proposed to the caller on the basis of at least two of the following options:
- a phone country code corresponding to said caller
- a phone country code corresponding to said recipient,
- a language comprised in a set of languages available for the transcription by said answering machine system,
- a language selected automatically on the basis of parameters set by the caller or the recipient
- a language defined by said caller,
- a language defined by said recipient.
- wherein said caller selects said language interacting with said answering machine system, and a corresponding voice message is transcribed into text of the selected language for forwarding to said recipient.

After proposing of one or more languages based on the aforementioned conditions, the caller selects the language by inputting a corresponding number or via voice command so that the voice message is transcribed into text. The language for the voice to text transcription can also be selected automatically on the basis of parameters set by the caller or the recipient.

The above and other aspects and advantages of the invention will become evident considering the following detailed description and the accompanying drawing in which:

BRIEF DESCRIPTION OF THE DRAWINGS

FIG. 1 represents a block diagram of the telephone network embodying a method and comprising devices and systems, for transcription of voice messages into text in accordance with some embodiments of the invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The entities that are playing fundamental roles in the systems for language determination in transcription of voice messages into text (VTTS) are: the phone 3 of the caller, the service provider 4 that is actually in contact with the phone 3 of the caller (notwithstanding that the service provider 4 is doing the roaming service or not), the global worldwide network 6 that connects service providers all around the world, the service provider 1 that is actually in contact with the phone 5 of the recipient and the answering machine comprising the Voice to Text Transcription VTT 2 hosted in the server of the service provider 1 that is receiving the phone call from the caller.

Therefore, the technical problem on the basis of the present invention is what to do on the side of the server having the VTT facility when the caller makes a phone call and the recipient is not answering and the service provider 1 wants to offer the recipient the possibility, not only of listening to the message of the caller, but also the transcription into text of the language of the caller of the voice message left by the caller. The choice of the language of the transcription can be made, however, using only the few information coming with the phone 3 of the caller (like the country code) or from some information stored in the server of the service provider 1 of the recipient. For instance at the moment when the recipient signs the phone agreement with the service provider 1 may set the language of transcription that he/she wants to be used for VTTS.

According to some useful embodiments of the present invention the server is capable of storing a previously selected language and/or settings of callers and recipients. According to the stored information the server proposes preferred languages to the callers and/or recipients or it automatically selects the language of VTT 2 used by the same caller during the previous calls. An advantageous embodiment to store relevant information is the storage of voice to text transcription languages related to a certain phone number. In this case the service provider 1 is taking note of the phone number of the caller and the language used before by the same caller for transcription, the answering machine has the possibility to automatically choose the language for the unanswered incoming call and performing the voice transcription into text, without the need to look for all languages available for transcription.

There are several advantageous options to define dependencies to propose preferred languages. A first option is to propose selected languages dependent on a caller's telephone number. In this case language selections from previous calls of a specific caller to a specific recipient are used to propose preferred languages. A second option is to propose selected languages dependent on a specific recipient. According to this option languages are proposed which are related to the country code of the recipient or those which were used in the past, regardless of the telephone number of a calling person and that were stored in the server. This option has the advantage that after a while of usage of the voice to text transcription system all usable languages according to a specific recipient are stored on the server, which increases the efficiency and speed to propose and select the proper language for future voice to text transcriptions.

There are several possibilities to define the phone country code. The phone country code is derived from phone country code contained in the corresponding phone number of the caller or recipient (for instance +41 for Germany, +44 for the United Kingdom, +33 for France, etc.), that is known to the VTT because, for example, sent to it by the telecommunication network 6 in occasion of an incoming call.

The phone country code also relates to the country of origin of used SIM-cards (or corresponds to the current position of said caller or recipient during the call) or also to the MCC (Mobile Country Code) and MNC (Mobile Network Code) which in combination form the International Mobile Subscriber Identity (IMSI), identifying uniquely the mobile phone operator/carrier and thus, implicitly the country where the call originated from or the country of the caller.

The usage of the terms, "propose", "proposing" or "proposal" related to the term "language" means to provide visible or listenable information or indications like voice messages naming one or more languages or a list consisting of one or more languages for manual or automatic selection. The usage of the phrase "country code" is equivalent to the phone country code.

Using the country code corresponding to caller or recipient as a condition, involves several possibilities on both sides, namely on the side of the caller and on the side of the recipient. One option dependent on the caller is the verification of the country code of the telephone number of the caller. It means that if the telephone number of the caller originates from a particular country or a specific telecommunication company based in a particular country, the country code of one of the countries is used and proposed respectively, which is normally one and the same country code. This approach is advantageous when the caller stays in his origin country in which he/she lives and speaks the local language, so the probability that the caller leaves a voice message in the local language is very high. This high probability is also given when the recipient stays and lives in the same country as the caller, and speaks the same language as the caller. It means that, even if the recipient is staying abroad from the country code of the caller, this leads to an efficient proposal or selection of the correct language. The aforementioned approach, namely the dependency on the caller's status is also advantageous when both parties, namely the caller and the recipient are staying abroad. While the caller is staying abroad implies two main verification options for the country code of the caller. The first option is that by the existence of roaming contracts and roaming systems between several telecommunication companies located across different countries, the verification of the country code of the caller is possible because of the fact that by initiating a call regardless of the position of the caller, the original country code of the caller's device or SIM-card is transmitted, so that proposing and/or selecting of the correct language is performed. This also leads to proposing and/or selecting the correct language when both parties are staying abroad and the recipient originates from the same or even a different country as the caller, because the probability that the recipient speaks the same language as the caller is very high. In summary it can be said that the dependency on the origin of the caller, regardless of the origin of the recipient, enables proposing and/or selecting of the correct voice to text transcription language.

In another advantageous embodiment (option) of the present invention, the status of the recipient is taken into consideration such as callers and/or recipients area of life or refers to a widespread language in the world. Analogous to the above advantageous approach the proposal/and selection of the correct language is performed depending on the recipient's original country code which for example is defined by the origin of the used device, SIM-card or the contract between the telecommunication company and the recipient.

Another advantageous embodiment (option) incorporates proposing and/or selecting of a world-wide spread language. This advantageous approach is performed by a predefined language which is known to the caller in advance or the language is announced through a voice message to the caller. The widespread language is specified dependent on local occurrences on region, state, national or international level. Some examples for widespread languages are English, Spanish, German, French, Portuguese, or the like.

In conclusion there are several languages that can be offered to the caller for the VTTS, what is important is that the caller selects the preferred language by inputting a corresponding language identification command or via voice command and then a corresponding voice message is transcribed into text of the selected language for forwarding to said recipient. The selection by the caller may be supported by a selection menu, for example displayed on the display of the caller's telephone, in particular of type of cordless phone, cell phone, smartphone or the like, whereby in the selection menu those languages are proposed on the display on the basis of at least two of the options:
- a phone country code corresponding to said caller,
- a phone country code corresponding to said recipient,
- a language comprised in a set of languages available for the transcription by said answering machine system,
- a language selected automatically on the basis of parameters set by the caller or the recipient,
- a language defined by said caller,
- a language defined by said recipient.

According to another advantageous embodiment the caller obtains the possibility to approve and/or modify his transcribed voice message. This option provides the transcribed text message to the caller before forwarding to the recipient. In this case the VTT server sends the transcribed text message (for instance as a SMS message) to the caller for approval and/or modification, before forwarding to the recipient and the caller review the transcribed text message while having the option to modify, expand or even discard the text message and avoid the forwarding. When the transcribed text is approved by the caller it is finally sent to the recipient.

The caller obtains advantageously also the possibility to attach data such as image, pdf (portable document format), textual data, URLs (Uniform Resource Locators) or the like to the text message. The advantageous possibility to attach data to a voice message which is then transcribed to text is not limited to the aforementioned option of reception of the transcribed text message before forwarding to the recipient. The advantageous attachment functionality is carried by selecting at least one data as an attachment before or after leaving a voice message. The VTT server or the telecommunication server recognizes the togetherness of the transcribed voice message and the selected data as attachment.

A further advantageous embodiment considers the set language of the device used by the caller. It is known that electronic devices, in particular telephones and cell phones which are interacting with users, are capable of providing different language settings. The advantageous consideration of the set device language contributes to automatically proposing and/or selecting the VTT language actually used by the caller independently from the SIM number or the country in which the call has been originated. Consequently, a request of the set language of the caller's and/or recipient's device leads to the proposal and/or selection of a VTT language that is correct and understandable by the caller and the recipient. It is clear that in this case the protocol of exchanging data between the server of the caller and the server of the recipient should be enhanced to also include this information in the data exchanged between the caller and the recipient.

According to a further advantageous embodiment of the present invention the language of stored textual contents, in particular textual messages like SMS, MMS, email, notes, twittered texts are considered to propose and/or select a correct and understandable VTT language. The aforementioned embodiment is advantageous because of analyzing the written form of textual contents which facilitates a better recognition of the language in comparison to applying an algorithm which analyzes the voice message for recognition of the used language. Also in this case the protocol of exchanging data between the server of the caller and the server of the recipient should be enhanced to also include this information in the data exchanged between the caller and the recipient.

Another advantageous embodiment considers contact list information of the caller and/or the recipient. This advantageous consideration is based on the fact that today's devices are capable of storing a contact list for several contact persons which provides the possibility for a plurality of entries for a single contact person. Possible fields of a single contact include entries about mobile phone number, landline number, home address, company address, homepage, first name, last name, company, notes, email address, homepage, birthday and even fields which can be modified individually by the user. Many of the aforementioned entries give considerable information to propose and/or select the correct and understandable VTT language. It is also advantageous to create an exclusive field to enter the language or languages for text transcription of each contact person. It is beneficial to implement an automatic request of language entry each time the user is creating a new contact on his device in particular telephone or cell phone. This advantageous and most trustworthy entry is then used when the caller dials the number of the recipient with the entry about his/her language to leave a voice message which is designated to be transcribed in a text message. In this case a particular information should be inserted in the exchange of data from the server of the service provider 4 related to the caller and the server of the service provider 1 related to the recipient. An additional advantageous effect of the aforementioned embodiment is the accessibility of contact lists over server systems such as various "cloud" facilities. Some entries of a contact list are then shared between different users and telecommunication companies. By observing laws governing data protection and data security it is possible to have entries that comprises telephone number and corresponding language or languages that are accessible by telecommunication companies for VTT services.

Another advantageous embodiment of the present invention is destined for consideration of a number of transcriptable and available languages to automatically propose and/or select the correct and understandable VTT language. The object of this beneficial embodiment is to consider regional, national or international capabilities regarding available languages for VTT services or limitation of language diversities. It may be the case that a VTT service is limited to some specific languages, so that one of the languages resulting from one of the previous advantageous embodiments is not supported or even a suitable algorithm for encryption of some exotic languages is not available. It is also conceivable that one or more languages of a VTT service are not supported at a specific time because of overloading, errors or accessibility problems. In the above mentioned cases the proposal and/or selection of a number of transcriptable and available languages is an advantageous embodiment to overcome these problems.

The selection of the language after proposing one according to one of the previous advantageous embodiments is performed automatically or manually. One advantageous way to achieve automatic selection of the language is offered by favoring or prioritizing one of the above mentioned conditions for the final selection of the language which leads to simplification of the VTT service for the caller. The prioritization means to regard one or a number of the above mentioned conditions which leads to one single language or a list of different languages. In case of obtaining a list of several languages an automatic selection is performed according to the language with the highest probability, for example the language on top of the list. It is also possible to have a special algorithm to analyze different languages derived by the above conditions to select one of the proposed languages for the VTT service.

A further advantageous strategy of the present invention is proposed by providing a manual selection for the caller and/recipient. According to this scenario the user, caller and/or receiver respectively obtains proposals comprising of one or a number of languages for selection. The proposal of the languages is in textual form, visible on the display of the user's device or as a voice message prompting the user to dial a number corresponding to one of the proposed languages, scroll and select one of the languages or repeat the desired language as a voice command.

Another advantageous embodiment proposes the manual selection by the user over a direct voice command at a specific position of the voice message. The specific position or time frame of the voice message is favorably at the beginning or at the end of the voice message. The definition of a specific time frame to name the language as voice command increases the probability to recognize the named language through a speech recognition algorithm. A scenario is to dial the number of a recipient and the caller names the VTT language directly at the beginning of the voice message, which is then verified by the speech recognition algorithm.

A further advantageous embodiment considers the situation when a caller is calling a recipient for the first time or when the information for the above mentioned conditions to propose and/or select a VTT language is not available. In this case it is possible to initiate a request that is then answered in real time by a potential recipient. The request is performed according to one of the options above and after the recipient answers to the question about the desired language the caller leaves a message in any desired language or even in the same language as desired by the potential recipient. In this way a translation service is involved in the VTT service. So that regardless of the language capabilities of the parties a communication between those is performed.

In specific types of cordless phones, cell phones or the like, providing a voice to text transcription profile for redirecting of incoming calls to a voice to text transcription service can be created or activated. Said profile can be activated by the user.

The present invention provides an additional advantageous embodiment for a telephone in particular a cordless telephone or a cell phone having a voice to text transcription profile. It is known that especially cell phones provide vibrating alert, silent profile or other profiles that are defined individually by the user. The advantageous approach for having a voice to text transcription profile enables manual determination of the telephone status. Beside the above mentioned advantages, additional advantages of VTT are conceivable in a situation in which the typical usage of known modes is not permitted such as during flights, by landing, by take-off or in electromagnetic sensitive areas like in hospitals or laboratories. Such advantages are achieved by using the VTT-profile to enable the recipient to receive transcribed voice messages by deciding and determining individually the reception status of the phone. An additional advantage is achieved in easing the situation for the caller while transmitting messages that are longer than SMS or email without strenuous manual writing.

For a further understanding of the invention we hereinafter describe typical examples, how the invention is used.

Let us assume that a caller is calling a recipient and let us further assume that the caller is able to talk in at least two languages, e. g. Portuguese and English. Furthermore, let us assume that the caller has a telephone which is allocated with the Brazilian phone country code 0055 and that the caller is calling somebody in the UK having the phone country code 0044. If then, due to absence of the recipient, the caller wants to leave a message on the answering machine of the recipient such that said text of the message shall be transcribed in a voice-to-text transcription, the caller has to decide which language he has to use. If the recipient is able only to talk in English, it does not make any sense if the caller uses Portuguese for his text message for the voice-to-text transcription, because this language is not been understood by the recipient. Thus, the system may propose to the caller to use the English language (on the basis of 0044) or Portuguese (on the basis of 0055) for his voice message and the caller may select English.

But if the recipient is also able to talk in Portuguese and in English, the system gives the caller the possibility to select between a language allocated to his phone country code (Brazil, thus Portuguese) or the phone country code of the recipient, thus English. Then the caller may use the language he/she is selecting (possibly the language he is most familiar with) such that the voice-to-text transcription is able to analyze his voice message in the selected language and is able to transcribe it into text.

Let us assume the aforementioned example by the variation, that the caller is somebody who speaks German as mother tongue and let us further assume that the recipient is the father of the caller and is also able to speak German as mother tongue. If then the caller, who is actually in Brazil, having a Brazilian phone country code, is calling his father in UK, who is having a UK phone country code, is not pleasant for the caller to talk to his father in Portuguese or English, even if the recipient is able to talk in Portuguese and in English and in German, but if the caller has a certain relationship with the recipient as a son or a daughter has a certain relationship to his or her father, they usually want to talk in their preferred language of communication, e. g. here in German as mother tongue.

Thus, it would be even better that the language selected automatically on the basis of a parameter set by the caller or the recipient, for example the recipient could set the parameter that in relation to a certain telephone number in Brazil, namely the telephone number of his son or his daughter, the German language is proposed as the preferred language and/or English and/or Portuguese as $2^{nd}$ and/or $3^{rd}$ option.

Another example could be that the answering machine of the recipient is not the most developed one such that the answering machine is only able to use one or two languages for the voice-to-text transcription, e.g. English and Dutch. Then, the caller should have the information which languages he may use for the voice-to-text message.

Thus, it also depends from the entire hard- and software used by the caller and/or recipient how many options may be used. The most obvious option sometimes may be to propose to the caller to use a language of his phone country code and the next option (which is also very probable) is that the language to be used is defined by the phone country code of the recipient. But, as mentioned before in the examples, sometimes this leads to a proposal that is not the best one and thus other options are to be taken into consideration for proposing the preferred language.

Furthermore, if the caller has allocated a certain language to a certain telephone number, it may be, that if the caller called another telephone number, he is still able to select between different languages on the basis of one of the aforementioned options.

Thus, the entire inventive system is also able to individualize the caller's wishes and the recipient's wishes and due to the fact there are lots of opportunities of various different recipients for one caller or various different callers for one recipient, the inventive system is flexible enough to be used in an automatic way supporting the voice-to-text transcriptions in various scenarios, such that in the end the text message is transcribed into a language which can be used by the recipient.

If, for example, the recipient is unable to talk in a certain language, e. g. French, it is also possible that the information that French cannot be accepted is electronically passed via message to the caller's phone, such that the caller by using a classical menu system (for selecting a language) sees in his menu, proposing various languages which can be used, that French cannot be accepted. Thus, in the menu, displayed on the display of the phone, preferably at the caller's phone like a cell phone, smart phone or the like, there is not only proposed those languages which can be used but it may also be added one or further languages which cannot be accepted by the recipient or his answering machine system.

A further variant of the invention can be the following:

Let us assume that the caller is somebody who is only able to speak in English and, furthermore, let us assume that the recipient is somebody who is not able to understand English but only the German language.

Then, the caller would use his English language for the text message for the voice-to-text transcription. In addition thereto, he/she could also decide, which automatic translation system should be used by the answering machine system for translating the English text into a German text. This is a very advantageous solution if, for example, the caller has very good experience with a certain translation system, e. g. "Google translator", which in his opinion is much better than another automatic translation system, e. g. "Leo" or other automatic translation systems.

Thus, it may also be part of the inventive method that the caller is not only selecting a certain language to be used by him/her for interacting with the answering machine, but that he/she is also deciding which translation program (software) or system should be used by the answering machine. If, for example, the caller is selecting the "Google" translation program, he/she is giving this information by an electronic order or an electronic information to the answering machine system such that after the voice-to-text transcription, the text is automatically passed to the "Google" translation system and in response thereto, the recipient is receiving the English text, translated by "Google translator", possibly together with a German text (or the German text only).

Another advantageous variant of the invention is that the translation service to be selected is automatically selected by the answering machine system because this machine system has been set by the recipient for using a certain translation service, e. g. "Leo". Then, the caller does not have the need to decide which translation system should be used, because the answering machine system is already programmed to use a certain translation system for the transcribed text. The method, devices and systems for transcription of voice messages into text and more particularly method, devices and systems to determine the language of voice to text transcription, may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to method, devices and systems to determine the language of voice to text transcription, as described in the present specification, but may be subject to many modifications, improvements or replacements of equivalent parts and elements without departing from the novelty spirit of the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claim.

The invention claimed is:

1. A method for determining a language among a plurality of languages available for a voice to text transcription of phone calls between a caller and a recipient provided by an answering machine system, comprising:
　　deriving a country code of said caller or said recipient;
　　selecting three or more languages to be included in a list of languages, wherein each selected language is determined to be a preferred language in that each language is identified as satisfying an initial acceptable probability of being selected later for use;
　　after the list of languages is generated, determining, for each language in the list, a subsequent probability of being selected for use, the subsequent probability being based at least partially on said derived country code and at least another technical option;
　　organize the list of languages based on each language's determined subsequent probability so as to generate a prioritized list of languages, whereby a first language with a highest subsequent probability is placed at a top of the prioritized list of languages followed by a second language with a second highest subsequent probability followed by a third language with a third highest subsequent probability;
　　presenting the prioritized list of languages to said caller;
　　selecting, by said caller, said language from among the prioritized list of languages by interacting with said answering machine system; and
　　transcribing a corresponding voice message into text of the selected language for forwarding to said recipient.

2. The method according to claim 1;
　　wherein said another technical option is selected from a group consisting of:
　　　　a language selected from a set of languages available for the transcription by said answering machine system;
　　　　a language selected automatically on the basis of parameters set by the caller or the recipient;
　　　　a language defined by said caller; and
　　　　a language defined by said recipient.

3. The method according to claim 1;
　　wherein said interacting comprises the step of inputting a corresponding language identification command or giving a voice command.

4. The method according to claim 1;
　　wherein at least one of said languages, selected from the prioritized list of languages, is defined by said callers and/or said recipient's area of residence or refers to a widespread language in the world.

5. The method according to claim 2;
　　wherein said phone country code is derived from the phone country code contained in the corresponding phone number of said caller or recipient, a phone country code related to a country of origin of used SIM-cards, or a phone country code corresponding to a current position of said caller or recipient during the call.

6. The method according to claim 1, further comprising the step of;
   providing a voice to text transcription mode to display the prioritized list of languages for manual language selection by said recipient or caller on a telephone of said recipient and/or caller.

7. The method according claim 1;
   wherein said answering machine is a part of a telecommunication server; and
   wherein said server stores language selection information of said caller and/or recipient to propose preferred languages for future voice to text transcriptions requested by said caller.

8. The method according to claim 1, further comprising the steps of;
   receiving, by said caller, a text message for approval and/or modification before said forwarding to said recipient; and
   subsequently forwarding said text message to said recipient when said caller approves said text message.

9. The method according claim 8, further comprising the steps of:
   attaching, by said caller, data into said transcribed text message through selection over said caller's telephone, wherein said attached data comprises at least one component selected from the group consisting of at least one of a text document, an image, an email, or a URL; and
   receiving, by said recipient, said data relating to said transcribed text message.

10. The method of claim 1, wherein the method further includes:
    receiving data from a device of the recipient, the data indicating that one or more particular languages are not acceptable at the recipient's device,
    whereby a device of the caller receives the data from the recipient's device, which data relates to the one or more particular languages that the recipient's device will not accept.

11. The method of claim 10, wherein the method further includes:
    displaying, on a display of the caller's device, the prioritized list of languages; and
    displaying, on the display of the caller's device, the one or more particular languages that are not acceptable at the recipient's device,
    whereby the caller's device displays both the prioritized list of languages and the one or more particular languages that are not acceptable at the recipient's device.

12. The method of claim 1, wherein, before the forwarding of the text to the recipient, an option is provided to the caller to modify the text.

13. A transcription system comprising:
    at least one electronic device to perform the method according to claim 1.

* * * * *